United States Patent [19]

Stephenson et al.

[11] Patent Number: 5,715,234
[45] Date of Patent: Feb. 3, 1998

[54] ELECTRONIC CAMERA AND ASSOCIATED PRINTER WHICH USES A DISPLAY IMAGE

[75] Inventors: Stanley W. Stephenson, Rochester; Dale F. McIntyre, Honeoye Falls, both of N.Y.

[73] Assignee: Eastman Kodak Company, Rochester, N.Y.

[21] Appl. No.: 767,573

[22] Filed: Dec. 16, 1996

[51] Int. Cl.⁶ ............... G03B 29/00; G03B 17/50; H04N 5/30
[52] U.S. Cl. ............... 396/429; 396/30; 358/906; 358/909.1
[58] Field of Search ............... 396/30, 429, 430, 396/374; 358/296, 302, 401, 501, 906, 909.1; 348/207, 373, 552, 839; 347/1, 2, 108

[56] References Cited

U.S. PATENT DOCUMENTS

| | | | |
|---|---|---|---|
| 4,262,301 | 4/1981 | Erlichman | 358/906 |
| 4,768,050 | 8/1988 | Beery | 354/304 |
| 4,937,676 | 6/1990 | Finelli et al. | 358/906 |
| 5,032,911 | 7/1991 | Takimoto | 358/76 |
| 5,049,902 | 9/1991 | Duke | 346/110 R |
| 5,122,432 | 6/1992 | Hammann | 430/138 |
| 5,164,751 | 11/1992 | Weyer | 396/430 |
| 5,493,409 | 2/1996 | Maeda et al. | 396/429 |
| 5,619,738 | 4/1997 | Petruchik et al. | 396/374 |

Primary Examiner—A. A. Mathews
Attorney, Agent, or Firm—Raymond L. Owens

[57] ABSTRACT

Apparatus is disclosed for capturing and printing images on a photosensitive sheet. The apparatus includes a camera for electronically storing an image of a subject and having a display for displaying such stored image and an alignment structure. A printer receives a photosensitive sheet which is driven to provide relative movement between a display area on the display and the photosensitive sheet. The printer further includes optics for focusing a the display area onto said photosensitive sheet and circuitry for providing electronic communication between the electronic camera and the printer so that the display area is imaged on the photosensitive sheet.

5 Claims, 2 Drawing Sheets

ELECTRONIC CAMERA AND ASSOCIATED PRINTER WHICH USES A DISPLAY IMAGE

CROSS REFERENCE TO RELATED APPLICATION

The present invention is related to U.S. patent application Ser. No. 08/767,394, filed simultaneously herewith, entitled "Electronic Camera and Integral Ink Jet Printer", assigned to the assignee of the present invention. The disclosure of these related applications is incorporated herein by reference.

FIELD OF THE INVENTION

The present invention relates to electronic cameras and to the printing of images produced by such camera.

BACKGROUND OF THE INVENTION

It is known in the prior art to provide an electronic camera which uses an area image sensor. Digital images produced from the image sensor are stored in memory and these images can be shown on a display so that the user can determine which image should be stored for use in producing hard copy images. Typically, these images can be stored in a magnetic disk or a compact PCMCIA Flash RAM Card or in dedicated memory within the camera.

A shortcoming with prior electronic cameras is that data must be transmitted from the electronic camera to printer. Interfaces must be present to transfer the data. As disclosed in U.S. Pat. No. 5,032,911, printers that write to light sensitive media print must have means within the printer that operate on received data and convert the data into modulated light to mark the photosensitive sheet. Many newer electronic cameras incorporate light emitting displays to view a captured image. However, the apparatus for producing such images is not available for light writing onto photosensitive media.

SUMMARY OF THE INVENTION

It is an object of the present invention to make use of an electronic image display in an electronic camera to write directly onto light sensitive media which can effectively provide a hard copy.

This object is achieved by apparatus for capturing and printing images on a photosensitive sheet comprising:
(a) a camera for electronically storing an image of a subject and having a display for displaying such stored image and including alignment means;
(b) a printer including means for receiving a photosensitive sheet; driving means providing relative movement between a display area on the display and the photosensitive sheet, such printer further including:
 (i) optical means for focusing the display area onto said photosensitive sheet;
 (ii) means for providing electronic communication between the electronic camera and the printer so that the printing area of said display is imaged on the photosensitive sheet.

Advantages

A feature of this invention is that a camera display is used to directly write onto the light sensitive media. Moreover, electronic interconnecting the printer and the camera permits the electronic camera to modulate the display in conjunction with the motion of the photosensitive sheet to produce an image on the photosensitive sheet.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics is disposed in each device and data is transmitted from the electronic camera to the printer.

Figure 1:
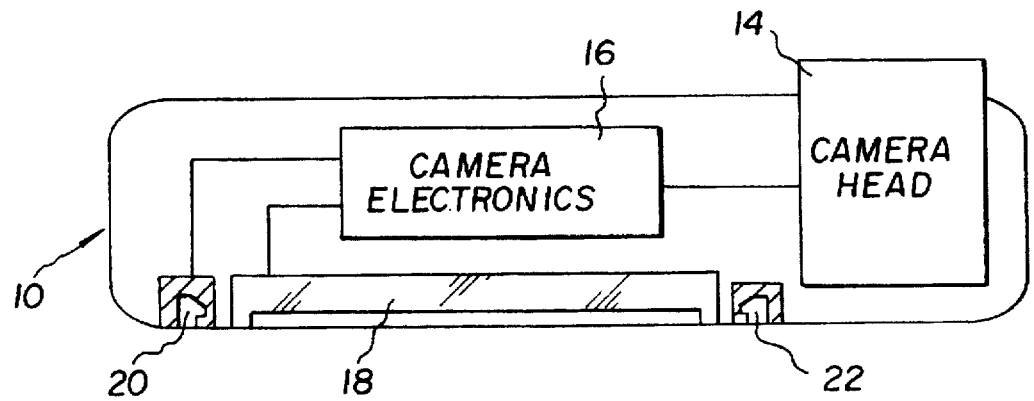
FIG. 1 is a top section view of an electronic camera which is adapted to be coupled to a printer in accordance with the present invention.
Figure 2:
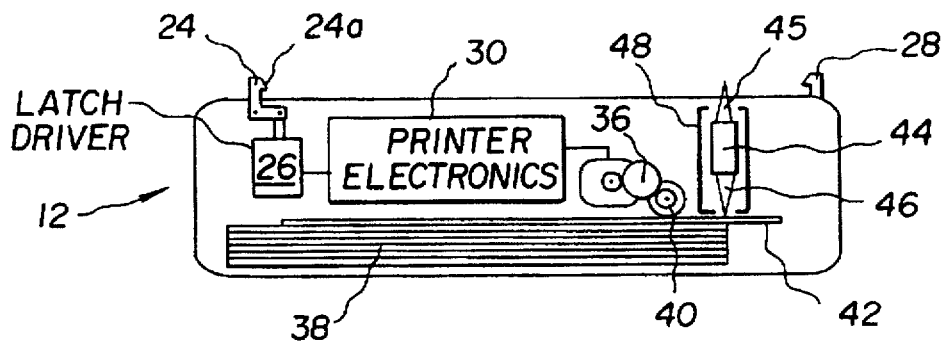
FIG. 2 is a top section view of the printer which is adapted to be coupled to the electronic camera of FIG. 1.

Turning now to FIG. 1, an electronic camera 10 is shown, and to FIG. 2 where a printer 12 is shown. Electronic camera 10 is of conventional design and can capture either still or motion images. Images are captured by camera head 14 and transferred to camera electronics 16. Camera electronics 16 is capable of displaying still images on camera display 18. Camera display 18 can be for instance a LCD or organic polymer display system of conventional design.

Electronic camera 10, in accordance with the present invention, includes the additional modification of an active socket 20 and a passive socket 22 for the purpose of securing the printer 12 over camera display 18. Active socket 20 incorporates electronic sensing circuitry to communicate with printer 12. Electronic sensing circuitry can be a wire active socket 20 to communicate with printer 12. Alternatively, a light sensing/transmitting assembly can be incorporated in or near the active socket 20.

Figure 3:
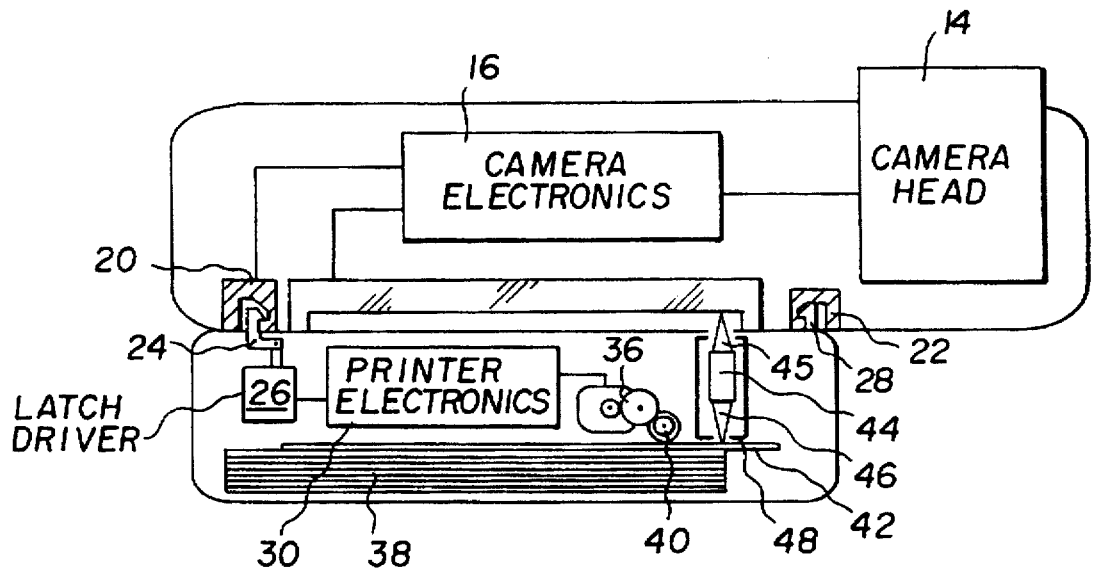
FIG. 3 shows the printer of FIG. 2 attached to the camera of FIG. 1.
Figure 4:
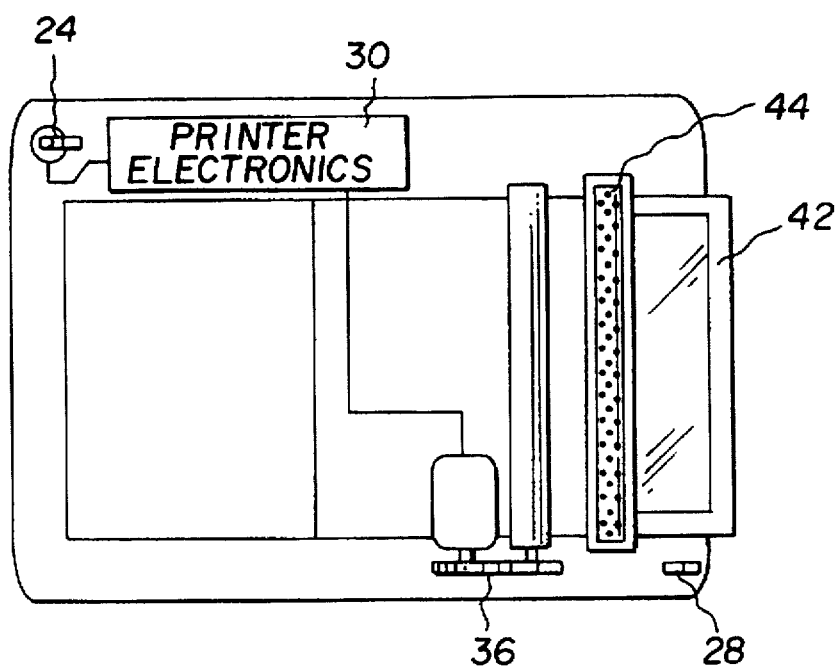
FIG. 4 is a front sectional view showing portions of the printer of FIG. 2.
Figure 5:
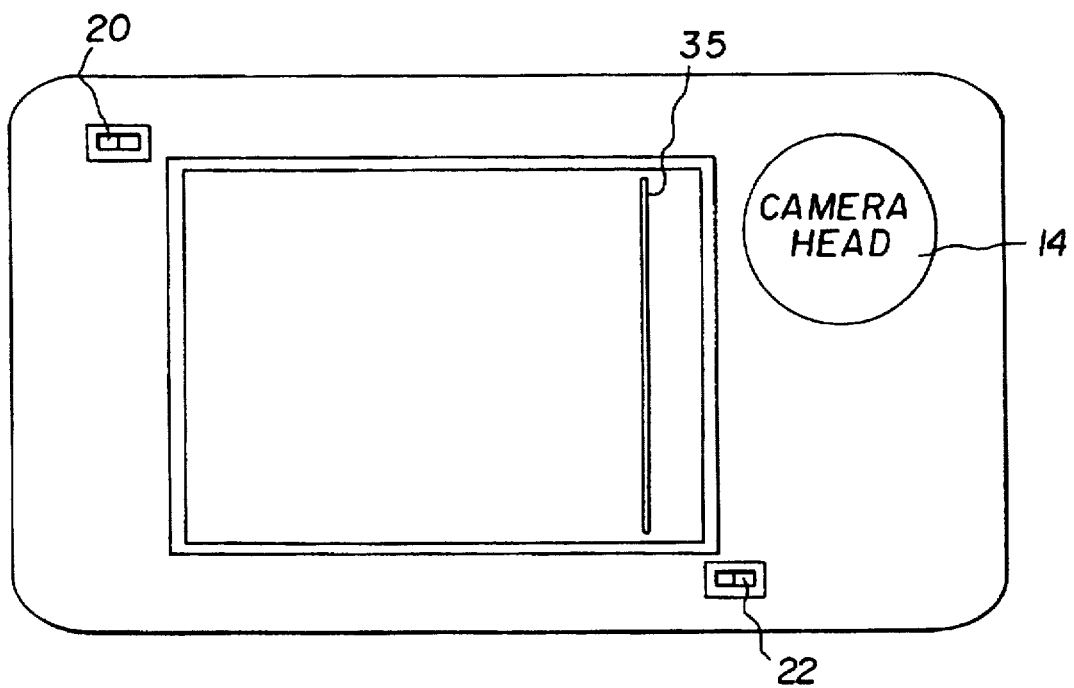
FIG. 5 is a rear view of the electronic camera shown in FIG. 1.

The printer 12 has an active latch 24 and a passive latch 28 that permits the printer to be secured over the camera display 18. In this embodiment the latches 24 and 28 are hooked and secure to matching detail 24a formed in the sockets 20 and 22 of camera 10. The rear view of the camera in FIG. 5 shows the position of the active socket 20 and the passive socket 22 and camera display 18. A latch driver 26 permits the selective securing and release of printer 12 from camera 10 under control of printer electronics 30. A compliant, light tight mask is disposed on the printer so that coupling printer 12 to electronic camera 10 mask camera display 18. FIG. 3 shows printer 12 secured to camera 10.

Printer 12 contains a stack of media sheets 38. These sheets are light sensitive and are loaded into the camera and stored in light sensitive manner as is known in the art. A roller 40, disposed over the stack, is driven by roller drive 36 to advance a photosensitive sheet 42 from media sheets 38 past an imaging area defined by printing optic 44 and light baffle 48. Photosensitive sheet 42 moves from the stack into the printing area in a light tight fashion as is well known in the art. In one embodiment printing optic 44 is an array of gradient index rods that have been formed into a linear array. Printing optic 44 can be formed from Nippon Sheet Glass rod lens array type 20B which has a total conjugate 15.1 mm. The actual element is 6.89 mm tall and first working distance 45 and second working distance 46 are 4.10 mm. Light baffle 48 is a light tight shell that surrounds the printing area and masks out the light transmitted from camera display 18 onto photosensitive sheet 42.

The sockets and latches are dimensionally controlled so as to align printing optic 44 with the light emitting elements of camera display 18. First working distance 45 should be located by the interface to focus on the light emitting elements of camera display 18. Second working distance 46 is provided for forming an image on the imaging surface of photosensitive sheet 42. Printing optic 44 is accurately positioned relative to the display when the printer is secured to the camera 10.

The positioning of the latches and sockets defines a display area 35 that will be used for printing. Light baffle 48 blocks light on both the sending and receiving sides of the image transfer path to minimize flare light.

An image is formed on photosensitive sheet 42 by advancing photosensitive sheet 42 an incremental amount using roller 40 and roller drive 36. Timing signals from printer electronics 30 are transmitted through an interface formed by active latch 24 and active socket 20. The timing signals are received by camera electronics 16. Camera electronics 16 modulates display area 35 to begin writing a line of the image onto photosensitive sheet 42. Although the disclosed arrangement is for writing a line of pixels at a time, it will be understood to those skilled in the art that other image segments, such as two lines or more, can also be written at a time. Display area 35 is selectively driven by camera electronics 16 so as to form a line of the printed image. After display area 35 has completed writing a line of the image, photosensitive sheet 42 is advanced again to begin the next printing cycle. The process is continued until a complete image is formed on photosensitive sheet 42.

After writing, the media can be passed through processing rollers that develop the written image and stabilize the media. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time.

In operation, an operator obtains a print by mounting the printer 12 with the electronic camera 10. Latches 24 and 28 automatically secure printer 12 in a light tight manner to camera display 18 on electronic camera 10. The operator signals the start of printing using printer electronics 30. Printer 12 advances photosensitive sheet 42 from the light tight area that stores media sheets 38 into a first writing position under printing optic 44. The printer's active socket 20 provides electronic communication with the camera electronics 16 to indicate that it is ready to receive image data from printer 12 using camera display 18. Upon print initialization, electronic camera 10 writes a first line of data by selectively modulating display line 35. After the first line is written, photosensitive sheet 42 is advanced into a position to write the second line. A signal is sent to electronic camera 10 and a second line is written. The process is repeated until a complete image is formed.

The use of the latch driver 26 under the control of printer electronics 30 ensures that printer 12 is not detached from electronic camera 10 during image transmission from camera display 18 and printer receiver device 32. An operator detaches printer 12 from electronic camera 10 using an interface to printer electronics 30 such as a conventional switch. Printer electronics 30 then activates latch driver 26 to permit removal of printer 12 from camera 10.

The invention has been described in detail with particular reference to a certain preferred embodiment thereof, but it will be understood that variations and modifications can be effected within the spirit and scope of the invention.

PARTS LIST 10 electronic camera
12 printer
14 camera head
16 camera electronics
18 camera display
20 active socket
22 passive socket
24 active latch
24a a detail
26 latch driver
28 passive latch
30 printer electronics
35 display line
36 roller drive
38 media sheets
40 roller
42 photosensitive sheet
44 printing optic
45 first working distance
46 second working distance
48 light baffle

We claim:

1. Apparatus for capturing and printing images on a photosensitive sheet comprising:
    (a) a camera for electronically storing an image of a subject and having a display for displaying such stored image and including alignment means;
    (b) a printer including means for receiving a photosensitive sheet; driving means providing relative movement between a display area on the display and the photosensitive sheet, such printer further including:
        (i) optical means for focusing the display area onto said photosensitive sheet;
        (ii) means for providing electronic communication between the electronic camera and the printer so that the printing area of said display is imaged on the photosensitive sheet.

2. The apparatus of claim 1 wherein the alignment means further includes an active socket which includes electronic sensing circuitry for communicating with the printer.

3. The apparatus of claim 1 further including a print head and means for preventing the printer unit from being detached from the camera when there is electronic communication between the display and the print head.

4. The apparatus of claim 1 wherein the optical means includes rod lens arrays.

5. The apparatus of claim 1 wherein the optical means images an image segment of the display onto the photosensitive sheet.

* * * * *